United States Patent [19]

Masuda

[11] Patent Number: 5,174,805

[45] Date of Patent: Dec. 29, 1992

[54] ORGANIC NEUTRAL LIQUID FERTILIZER AND PROCESS FOR PREPARING THE SAME

[76] Inventor: Toshio Masuda, 37-12 Bessho-machi, Ohmiya-shi, Saitama-ken, Japan

[21] Appl. No.: 651,661

[22] Filed: Feb. 6, 1991

[30] Foreign Application Priority Data

Feb. 13, 1990 [JP] Japan ................................. 2-29528
Jan. 24, 1991 [JP] Japan ................................. 1-7281

[51] Int. Cl.⁵ .......................... C05C 9/00; C05G 3/00
[52] U.S. Cl. ...................................... 71/29; 71/64.1; 71/DIG. 2
[58] Field of Search .............................. 71/11, 28–30, 71/64.1, DIG. 2

[56] References Cited

U.S. PATENT DOCUMENTS 3,950,159  4/1976  Fox et al. ................................. 71/11

FOREIGN PATENT DOCUMENTS 107450  5/1984  European Pat. Off. ............ 71/64.1
223681  12/1983  Japan .

*Primary Examiner*—Ferris Lander
*Attorney, Agent, or Firm*—Pennie & Edmonds

[57] ABSTRACT

The present invention provides a neutral liquid fertilizer comprising as essential ingredients nitrogenous, phosphatic and potash fertilizers and an organic acid, and a thickener, and also provides a process for preparing the same.

2 Claims, No Drawings

ORGANIC NEUTRAL LIQUID FERTILIZER AND PROCESS FOR PREPARING THE SAME

FIELD OF THE INVENTION

The present invention relates to an organic neutral liquid fertilizer and a process for preparing the same.

PRIOR ART

Fertilizers in current use are available in the form of dust, granules, liquid, and the like. Regardless of their forms, almost all fertilizers exhibit strong acidity. The major component of fertilizers is salts except for urea.

For example, ammonium sulfate is strongly acidic and has a pH of 4.0-4.5. Potash fertilizer is mainly composed of potassium sulfate and potassium chloride and therefore, like ammonium sulfate, it contains a large amount of sulfate radical. Phosphatic fertilizer is mainly composed of liquid phosphoric acid and therefore, it exhibits strong acidity. To neutralize such acidity, liquid phosphoric acid has been combined with lime to produce a calcium superphosphate fertilizer or combined with plaster to form phosphatic fertilizer soluble in organic acid solution, both fertilizers being commercially available.

PROBLEMS TO BE SOLVED BY THE INVENTION

Conventional fertilizers render the soil of cultivated areas and paddy fields acidic, due to accumulation of inorganic salts such as sulfate anion, resulting in acidification of the soil to pH 4.0-4.5. Such accumulation retards the growth of crops and causes root rot, stem rot, and injury by continuous cropping. Ammonium sulfate is degraded to nitrous acid nitrogen in a strongly acidic soil. Nitrous acid nitrogen interferes with the protein synthesis and starch production in plants and is likely to accumulate in stems and leaves in the form of an incomplete protein, which decreases tolerance of plants to temperature changes. At a higher temperature, the undergradable nitrogen source in stems and leaves turns into a gaseous form to cause the cell burst. The cell burst makes plants susceptible to fungus diseases such as powdery mildew. Such diseases have been one of the major issues in agriculture. To prevent acidification of soil and to maintain productive soil in cultivated areas and paddy fields, the development of neutral fertilizer free of sulfate has been an imperative demand among the agriculturists.

MEANS FOR SOLVING THE PROBLEM

When a strong acid is reacted with a strong alkali in a large scale, the reaction is explosive. A neutral liquid fertilizer has not been industrially manufactured due to the danger of the reaction. The present inventor has found a method of preventing the explosion caused by heat of neutralization. Namely, it has surprisingly been found that explosive heat of neutralization can effectively be quenched by performing the reaction in an organic acid solution.

SUMMARY OF THE INVENTION

The first aspect of the invention is to provide an organic neutral liquid fertilizer comprising as essential ingredients nitrogenous, phosphatic acid potash fertilizers and an organic acid, and a thickener.

The second aspect of the invention is to provide process for preparing said organic neutral liquid fertilizer, comprising the steps of:

(a) adding an organic acid to water with stirring at room temperature;

(b) adding ⅓ of the amount to be used of liquid phosphoric acid gradually to the above mixture with stirring;

(c) adding ⅓ of the amount to be used of potassium hydroxide gradually to the mixture with stirring while keeping the temperature below 60° C., and then allowing the temperature to rise to 90° C.;

(d) adding ⅓ of the amount of urea all at once to the mixture, which decreases the temperature to about 40° C.;

(e) repeating the above steps (b)-(d) twice;

(f) adding a thickener and an amino acid to the mixture; and (g) adding either chelated iron and copper sulfate or ammonium iron citrate to the mixture.

According to the invention, ammonium sulfate is usually used as a nitrogenous source, liquid phosphoric acid as a phosphatic source, and potassium hydroxide as a potash source.

Thickeners which may be mentioned include synthetic resins such as polyvinyl alcohol, sodium alginate, seaweed extract, etc. These thickeners can encapsulate the essential ingredients such as nitrogenous, phosphatic and potash fertilizers and imparts slow-acting property to the product. Among the thickeners, sodium alginate is preferable since it has buffering effects on the pH value.

Chelated iron and copper sulfate may attach to plants and facilitate the absorption of the sun light by the stems and leaves. In addition, these agents render the product of the invention moss-green, thus increasing the aesthetic value fo the product. Alternatively, ammonium iron citrate may be used instead of said chelated iron and copper sulfate.

Examples of the amino acids include naturally occurring L-amino acids. Preferably, L-amino acid mixture prepared from hoof hydrolysates of a cattle or a horse is used.

The organic neutral liquid fertilizer of the invention may contain a trace element (e.g., Mn, Fe, B, Cu, Zn, Cl, etc.) in addition to the above ingredients.

Organic acids which may be mentioned include citric acid, acetic acid, malic acid, fumaric acid, and the like.

The first aspect of the invention is to provide an organic neutral liquid fertilizer which does not acidify soil. Another aspect of the invention is to provide a process of said fertilizer wherein explosive heat of neutralization can be quenched by conducting the reaction of a strong acid and a strong alkali in an aqueous organic acid solution. The generation of explosive heat of neutralization may effectively be prevented by the following procedure: A portion of the amount intended to be used of phosphoric acid, normally about ⅓ in the case of a 200 l reactor is used, is first dissolved in an aqueous solution of an organic acid at room temperature. Then, ⅓ of the amount of potassium hydroxide is added portionwise to the solution with stirring while keeping the temperature below 60° C. After the addition of potassium hydroxide is completed and when the temperature of the mixture rises to 90° C., ⅓ of the amount of urea is added to the mixture all at once with stirring, which decreases the temperature rapidly to 50°-60° C. Thus, loss of nitrogen due to vaporization can also be prevented. The generation of explosive heat of neutralization from the reaction between liquid phosphoric acid and potassium hydroxide may thus be quenched through the use of organic acid and urea. The above procedure may be repeated twice more. The frequency of the repitition of the procedure depends on the volume of the reactor used and the ability of the cooling apparatus of the reactor. In the case a 200-300 l reactor is used, thrice repititions of the procedure are required.

In the procedure as described above, phosphoric acid, potassium hydroxide, and then urea are added in this order. However, the order of the addition may be varied and the order of phosphatic acid, urea, and then potassium hydroxide, may also be possible for preventing the generation of explosive heat of neutralization.

As described above, the present invention provides a safe process for preparing an organic neutral liquid fertilizer. In the manufacturing process of the fertilizer, the generation of explosive heat of neutralization can be quenched according to present invention. Furthermore, a maximum temperature in the manufacturing process of the fertilizer is kept below 90° C. at which evaporation of nitrogenous ingredient is prevented, thus providing an organic neutral fertilizer containing a high concentration each of individual components N, P, K. The organic neutral liquid fertilizer of the invention prevents soil from acidification, facilitates the absorption of nutrients by plants and increases the crop yields because of less damage on plants by insects or diseases. Since the fertilizer does not acidify soil, the fertilizer may serve to conserve the environment.

EXAMPLE

The present invention will be illustrated in detail by the following Examples which are not intended to limit the scope of the invention.

EXAMPLE 1

1 kg of citric acid was added with stirring to 100 l of water in a 200 l enameled tank equipped with a stirrer, a thermometer and a cooling apparatus. A total of 18 kg of 75% liquid phosphoric acid was then added in 1 kg portions with stirring to the citric acid solution (17° C.) over a period of 30 minutes. The temperature of the mixture rose to 28°-30° C. A total of 17 kg of potassium hydroxide flakes was added in 1 kg portions with stirring to the mixture over a period of 30 minutes while keeping the temperature below 60° C. After the addition of potassium hydroxide was completed, the temperature of the mixture rose to 90° C. When 20 kg of urea was added all at once to the mixture, the temperature of the mixture decreased rapidly to about 40° C. Then the addition of 18 kg of liquid phosphoric acid, 17 kg of potassium hydroxide and 20 kg of urea were repeated twice more. 2 kg of sodium alginate and 0.2 kg of a mixture of L-amino acids prepared from horse hoof hydrolysate were then added gradually to the mixture to impart viscosity. Separately, 800 g of chelated iron was dissolved in 5 l of warm water and to this solution, 400 g of copper sulfate was added. The two mixtures were then combined to give a viscous moss-green liquid fertilizer. The pH of the product was about 7.0.

EXAMPLE 2

1 kg of citric acid was added with stirring to 85 l of water in an enameled tank as described in Example 1. A total of 18 kg of liquid phosphoric acid was then added gradually in 1 kg portions with stirring to the above solution. After stirring thoroughly 20 kg of urea was added all at once to the mixture. When urea was dissolved completely, a total of 17 kg of potassium hydroxide was added in 1.7 kg portions with stirring. Heat of neutralization elevated the temperature of the mixture to about 75° C. During continuous stirring for about 25 minutes, the temperature was decreased to about 50° C. when liquid phosphoric acid was added again to the mixture. The addition of liquid phosphoric acid, urea, and potassium hydroxide was repeated as above. Thereafter, sodium alginate, amino acid, chelated iron and copper sulfate were added to the mixture as in Example 1. The resulting product, a neutral liquid fertilizer, was a viscous moss-green mixture.

The content each of N, P and K of the product was about 12%, and such content was considerably high. The pH of the product was about 7.0.

What is claimed is:

1. A process for preparing a neutral liquid fertilizer comprising the steps of:
   (a) adding an organic acid selected from the group consisting of citric acid, acetic acid, malic acid and fumaric acid, to water with stirring at room temperature;
   (b) adding ⅓ of the amount to be used of liquid phosphoric acid gradually to the above mixture with stirring;
   (c) adding ⅓ of the amount to be used of potassium hydroxide gradually to the mixture with stirring while keeping the temperature below 60° C., and then allowing the temperature to rise to 90° C.;
   (d) adding ⅓ of the amount of urea all at once to the mixture, which decreases the temperature to about 40° C.;
   (e) repeating the above steps (b)-(d) twice;
   (f) adding a thickener and an amino acid to the mixture; and
   (g) adding either chelated iron and copper sulfate or ammonium iron citrate to the mixture.

2. The process according to claim 1 in which the organic acid is citric acid.

* * * * *